(12) United States Patent
McLeod (10) Patent No.: US 11,538,358 B2
(45) Date of Patent: Dec. 27, 2022

(54) METHOD OF TRAINING FOR WELDING THROUGH VIRTUAL REALITY

(71) Applicant: Sherman McLeod, Philadelphia, PA (US)

(72) Inventor: Sherman McLeod, Philadelphia, PA (US)

(*) Notice: Subject to any disclaimer, the term of this patent is extended or adjusted under 35 U.S.C. 154(b) by 0 days.

(21) Appl. No.: 17/409,560

(22) Filed: Aug. 23, 2021

(65) Prior Publication Data

US 2021/0383721 A1 Dec. 9, 2021

Related U.S. Application Data (63) Continuation-in-part of application No. 15/960,201, filed on Apr. 23, 2018, now Pat. No. 11,120,703.

(51) Int. Cl.
*G09B 19/24* (2006.01)
*G09B 9/00* (2006.01)
*G06F 3/01* (2006.01)

(52) U.S. Cl.
CPC ............ *G09B 19/24* (2013.01); *G06F 3/011* (2013.01); *G09B 9/00* (2013.01)

(58) Field of Classification Search
CPC ............ G09B 19/24; G09B 9/00; G06F 3/011
See application file for complete search history.

(56) References Cited

U.S. PATENT DOCUMENTS

| | | | |
|---|---|---|---|
| 9,724,787 B2 * | 8/2017 | Becker | B23K 9/0956 |
| 10,096,268 B2 | 10/2018 | Albrecht | |
| 10,438,505 B2 * | 10/2019 | Becker | B23K 9/0956 |
| 10,446,057 B2 | 10/2019 | Bauer | |
| 10,643,495 B2 | 5/2020 | Boettcher et al. | |
| 10,762,802 B2 * | 9/2020 | Wallace | G09B 9/00 |
| 2006/0136183 A1 * | 6/2006 | Choquet | G09B 5/00 703/11 |
| 2008/0038702 A1 * | 2/2008 | Choquet | A61B 5/1124 434/260 |
| 2014/0017642 A1 * | 1/2014 | Postlethwaite | G09B 19/24 434/234 |

(Continued)

FOREIGN PATENT DOCUMENTS

WO WO2012082105 A1 6/2012

*Primary Examiner* — Nathan Hillery (57) ABSTRACT

A method of training for welding through virtual reality (VR) provides a VR headset, a processing device, and a welding training tool. The processing device is communicably coupled with the VR headset and the hand-held welding training tool designed to simulate a real-world welding experience in VR. A virtual welding environment is displayed through the VR headset, and motion tracking input is received through the welding training tool. The user input is analyzed using an AI algorithm to evaluate user welding performance. User feedback devices such as sound and scent generation may be implemented in order to simulate a welding procedure. AI user feedback is implemented based on the welding performance to guide learning. Welding scenarios may be completed to train for welding in the virtual welding environment, and virtual currency may be awarded for gamification purposes. Multi-participant welding scenarios and immersive, objective-based, simulated real-world environments are further implemented.

20 Claims, 8 Drawing Sheets (56) References Cited

U.S. PATENT DOCUMENTS

| | | | |
|---|---|---|---|
| 2015/0056584 A1* | 2/2015 | Boulware | B23K 9/32 |
| | | | 434/234 |
| 2015/0170539 A1* | 6/2015 | Chica Barrera | G09B 9/00 |
| | | | 434/234 |
| 2015/0235565 A1* | 8/2015 | Postlethwaite | G09B 9/00 |
| | | | 434/234 |
| 2015/0248845 A1* | 9/2015 | Postlethwaite | G09B 19/24 |
| | | | 434/234 |
| 2015/0375323 A1* | 12/2015 | Becker | G09B 19/24 |
| | | | 700/160 |
| 2015/0375327 A1* | 12/2015 | Becker | A61F 9/06 |
| | | | 219/130.01 |
| 2016/0012750 A1* | 1/2016 | Wallace | G09B 9/00 |
| | | | 434/234 |
| 2016/0039053 A1* | 2/2016 | Becker | B23K 9/0956 |
| | | | 228/8 |
| 2016/0155361 A1 | 6/2016 | Peters et al. | |
| 2016/0267806 A1* | 9/2016 | Hsu | B23K 9/0956 |
| 2016/0343268 A1* | 11/2016 | Postlethwaite | G09B 5/00 |
| 2017/0046974 A1* | 2/2017 | Becker | G09B 19/003 |
| 2017/0046975 A1* | 2/2017 | Becker | B23K 9/282 |
| 2017/0046976 A1* | 2/2017 | Becker | B23K 9/282 |
| 2017/0046977 A1* | 2/2017 | Becker | B23K 9/0956 |
| 2017/0046982 A1* | 2/2017 | Wallace | G09B 19/24 |
| 2017/0200384 A1* | 7/2017 | Albrecht | G09B 19/24 |
| 2018/0102061 A1* | 4/2018 | Beeson | B23K 9/173 |
| 2018/0126476 A1* | 5/2018 | Meess | G05B 19/182 |
| 2018/0130376 A1* | 5/2018 | Meess | G06T 7/70 |
| 2018/0130377 A1* | 5/2018 | Meess | B23K 9/0953 |
| 2018/0193853 A1 | 7/2018 | Fateh | |
| 2018/0357923 A1 | 12/2018 | Daniel et al. | |
| 2019/0325779 A1* | 10/2019 | Meess | G09B 19/00 |

* cited by examiner

METHOD OF TRAINING FOR WELDING THROUGH VIRTUAL REALITY

The current application is a continuation-in-part (CIP) application of a U.S. non-provisional application Ser. No. 15/960,201 filed on Apr. 23, 2018.

FIELD OF THE INVENTION

The present invention relates generally to virtual reality. More particularly, the present invention relates to using virtual reality equipment to facilitate training welding skills and knowledge.

BACKGROUND OF THE INVENTION

Virtual reality (VR) is a computer-generated scenario that simulates a realistic experience. Immersive digitally rendered environments can be similar to the real world in order to create a lifelike experience grounded in reality or science fiction. Augmented reality systems may also be considered a form of VR that layers virtual information over a live camera feed into a headset, or through a smartphone or tablet device.

Current VR technology most commonly uses virtual reality headsets or multi-projected environments, sometimes in combination with physical environments or props, to generate realistic images, sounds and other sensations that simulate a user's physical presence in a virtual or imaginary environment. A person using virtual reality equipment is able to "look around" the artificial world, move around in it, and interact with virtual features or items. The effect is commonly created by VR headsets consisting of a head-mounted display with a small screen in front of the eyes, but can also be created through specially designed rooms with multiple large screens.

VR systems that include transmission of vibrations and other sensations to the user through a game controller or other devices are known as haptic systems. This tactile information is generally known as force feedback in medical, video gaming and military training applications. Virtual reality has many applications in a variety of fields, most commonly used in entertainment applications such as gaming and 3D cinema.

Welding is a fabrication or sculptural process that joins materials, usually metals or thermoplastics, by causing fusion, which is distinct from lower temperature metal-joining techniques such as brazing and soldering, which do not melt the base metal. In addition to melting the base metal, a filler material is typically added to the joint to form a pool of molten material (the weld pool) that cools to form a joint that is usually stronger than the base material. Pressure may also be used in conjunction with heat, or by itself, to produce a weld. Welding also requires a form of shield to protect the filler metals or melted metals from being contaminated or oxidized. Although less common, there are also solid state welding processes such as friction welding in which metal does not melt.

One of the most common types of arc welding is shielded metal arc welding (SMAW); it is also known as manual metal arc welding (MMA) or stick welding. Electric current is used to strike an arc between the base material and consumable electrode rod, which is made of filler material (typically steel) and is covered with a flux that protects the weld area from oxidation and contamination by producing carbon dioxide ($CO_2$) gas during the welding process. The electrode core itself acts as filler material, making a separate filler unnecessary.

The process is versatile, making it well suited to shop jobs and field work. An operator can become reasonably proficient with a modest amount of training and can achieve mastery with experience. Other types of welding include gas metal arc welding (GMAW), flux-cored arc welding (FCAW), gas tungsten arc welding (GTAW) or tungsten inert gas (TIG) welding, and submerged arc welding (SAW).

Each type of welding is a process that must be learned by the user over a period of many training sessions. Welding equipment is expensive, often prohibitively so for an average person to purchase or rent. The present invention seeks to provide a digital platform through which a user may perform a wide variety of practice and test scenarios and activities for welding through virtual reality. The user may be provided through the present invention various training courses for welding through which to progress to hone their skills and evaluate their performance, as well as a variety of secondary activities related to welding such as, but not limited to, practicing welding-related mathematical exercises, blueprint reading, adding component layouts, grinding surfaces, welding assemblies and subassemblies, welding machine set-ups, weld filler materials specifications, and various material properties to be welded.

Additional advantages of the invention will be set forth in part in the description which follows, and in part will be obvious from the description, or may be learned by practice of the invention. Additional advantages of the invention may be realized and attained by means of the instrumentalities and combinations particularly pointed out in the detailed description of the invention section. Further benefits and advantages of the embodiments of the invention will become apparent from consideration of the following detailed description given with reference to the accompanying drawings, which specify and show preferred embodiments of the present invention.

DETAIL DESCRIPTIONS OF THE INVENTION

All illustrations of the drawings are for the purpose of describing selected versions of the present invention and are not intended to limit the scope of the present invention. The present invention is to be described in detail and is provided in a manner that establishes a thorough understanding of the present invention. There may be aspects of the present invention that may be practiced or utilized without the implementation of some features as they are described. It should be understood that some details have not been described in detail in order to not unnecessarily obscure focus of the invention. References herein to "the preferred embodiment", "one embodiment", "some embodiments", or "alternative embodiments" should be considered to be illustrating aspects of the present invention that may potentially vary in some instances, and should not be considered to be limiting to the scope of the present invention as a whole.

The terminology used herein is for the purpose of describing particular embodiments only and is not intended to be limiting of the invention. As used herein, the term "and/or" includes any and all combinations of one or more of the associated listed items. As used herein, the singular forms "a," "an," and "the" are intended to include the plural forms as well as the singular forms, unless the context clearly indicates otherwise. It will be further understood that the terms "comprises" and/or "comprising", when used herein, specify the presence of stated features, steps, operations, elements, various embodiments, and/or components, but do not preclude the presence or addition of one or more other features, steps, operations, elements, various embodiments, components, and/or groups thereof.

Unless otherwise defined, all terms (including technical and scientific terms) used herein have the same meaning as commonly understood by one having ordinary skill in the art to which this invention belongs. It will be further understood that terms, such as those used in commonly used dictionaries, should be interpreted as having a meaning that is consistent with their meaning in the context of the relevant art and the present disclosure and will not be interpreted in an idealized or overly formal sense unless expressly so defined herein.

In describing the invention, it will be understood that a number of techniques, embodiments and/or steps are disclosed. Each of these has individual benefit and each can also be used in conjunction with one or more, or in some cases all, of the other disclosed techniques, embodiments and/or steps. Accordingly, for the sake of clarity, this description will refrain from repeating every possible combination of the individual steps, techniques, or embodiments in an unnecessary fashion. Nevertheless, the specification and claims should be read with the understanding that such combinations are entirely within the scope of the invention and the claims.

The present disclosure is to be considered as an exemplification of the invention, and it is not intended to limit the invention to the specific embodiments illustrated by the figures or descriptions.

The present invention is a method of training for welding through virtual reality. More particularly, the present invention is an expert method with no need for an instructor with experience. The present invention utilizes computer-executable instructions stored on a non-transitory computer-readable medium to interface with hardware components in order to facilitate the purpose of the present invention. The present invention may be generally embodied as a software program, application or combination of applications written in any relevant programming language or application creation tool, and may be carried out through various electronic hardware, circuitry, or other components. In some instances, the present invention may be known by the nomenclature of "VRWeld." The present invention, VRWeld, is presented as a welding simulator promoting creativity, critical thinking, and knowledge ownership in a gamified, VR environment. VRWeld seeks to enrich aspiring professionals and provide affordable, realistic training solutions.

The user wears a virtual reality headset through which the user experiences a welding training environment and other secondary applications. The software of the present invention may be run from a mobile device such as a cell phone, or from a laptop, desktop personal computer (PC), or any other suitable computing device capable of implementing the present invention and communicably coupled with the virtual reality headset. Furthermore, the user is provided with an electronic user interface implement resembling a welding gun or similar device, and/or other relevant user input devices, in order to interact with the present invention. Through this combination of hardware and software, the user is afforded the opportunity to experience a variety of welding scenarios and other situations in order to increase their welding proficiency from beginner to expert level. The present invention further utilizes artificial intelligence (AI) and gamification aspects in order to enhance the user's learning experience through the present invention. In various embodiments, the present invention may be implemented as a standalone computer-executable program or application, or the present invention may be administered and operated over an Internet connection or other suitable electronic network connection by and/or through one or more remote servers, databases, cloud computing networks, or any other suitable hardware and/or software components and/or systems.

The present invention may utilize any form of VR commercially available on the market or new VR technology as appropriate. The present invention may be utilized in conjunction with a variety of physical welding training tools, such as welding guns, stingers, foot pedals, and any other types of welding apparatus available for any type of welding. The present invention may be used to gain experience in types of welding such as, but not limited to, shielded metal arc welding (SMAW), gas metal arc welding (GMAW), flux-cored arc welding (FCAW), submerged arc welding (SAW), gas tungsten arc welding (GTAW), or other types of welding, such as machine welding and more.

Further, The VRWeld Product will allow for assembly welding of various shapes of metal including, but not limited to, angel, channel, I-beam, round, square, flat, hexagonal, or other applicable profiles within the VRWeld system. This is in service of the goal of, for example, building a building and/or fabricating parts to be welded together either using VR blueprints or user-designed parts that could involve either static parts or parts in motion in the VR space for rapid prototyping.

Further, preferably, the VRWeld product will also include fabrication of parts using cutting tools like chop saws, grinders, precision CNC machines, and advanced computerized measurement tools, manual measurement tools such as caliper, micrometers, centricity, etc. with a half of thousandths of inches in either standard English or metric units.

The physical equipment utilized in the present invention in conjunction with the VR system may be integrated into the system so that various aspects may be implemented, such as, but not limited to: vibration, sound, visuals, perception, spatial dimensions, machine setup, welding mathematics, blueprint reading, and fabrication of two or more components in any shape (such as small components being welded to large structural steel assemblies and subassemblies). These aspects may be implemented as part of the design of the system to facilitate the experience of individuals who desire to learn welding processes and other aspects of welding, including, but not limited to, machine changeover, set-up troubleshooting, welding, OSHA safety, and more. The present invention is intended to simulate all aspects of the welding process. The present invention allows individuals to sharpen their welding skills such that aspects such as their straightness, visual or other sensations such as smell, sound, or tactile feedback closely simulates an actual experience of welding in the real world.

The present invention may include the use of and training in different types of welding materials, joints, shapes, positions, and other relevant welding variables. The present invention may include welding training for all positions of welding in the following positions: 1G, 2G, 5G and 6G for pipe, 1F, 2F, 3F, and 4F for fillet welds, 1G, 2G, 3G, and 4G for plates, or any combination of beveled or straight edges in combination with any subassembly or complete assembly of any fabricated plates, pipes, tubing, or any other surfaces for all types of steel (including, but not limited to: mild steel, stainless steel, and other types of steel), aluminum, copper, brass, or other materials. The present invention may also cover the use of thin gauge materials or thicker gauge materials to be welded in any combination.

The present invention adapts actual welding attachments so that the user will experience in a simulated environment weld processes that correspond to physical welding environments in the real world. The physical welding environment may be simulated so that the user may perform welding processes according to standards such as AWS, American Petroleum, military, or other standards. The welding angle, speed, puddle, or full fusion as well as various weld patterns may be allowed to be utilized in a freestyle format by the user for learning how to weld.

Visuals displayed to the user through the VR headset are immersive and designed to teach and engage users with respect to such subjects as blueprint reading, welding joints, assembly, contextual math, troubleshooting, and more. Physical equipment provided for use with the present invention should include a device resembling a real-world in-house welding tool which is capable of pairing with all VR platforms. Furthermore, it is desired that the welding tool be capable of vibration, motion tracking, and/or eye tracking to develop technique. Further physical equipment may be utilized for producing sounds and smells such as those experienced during real-world welding processes to engage the user and develop an immersive atmosphere.

Figure 1:
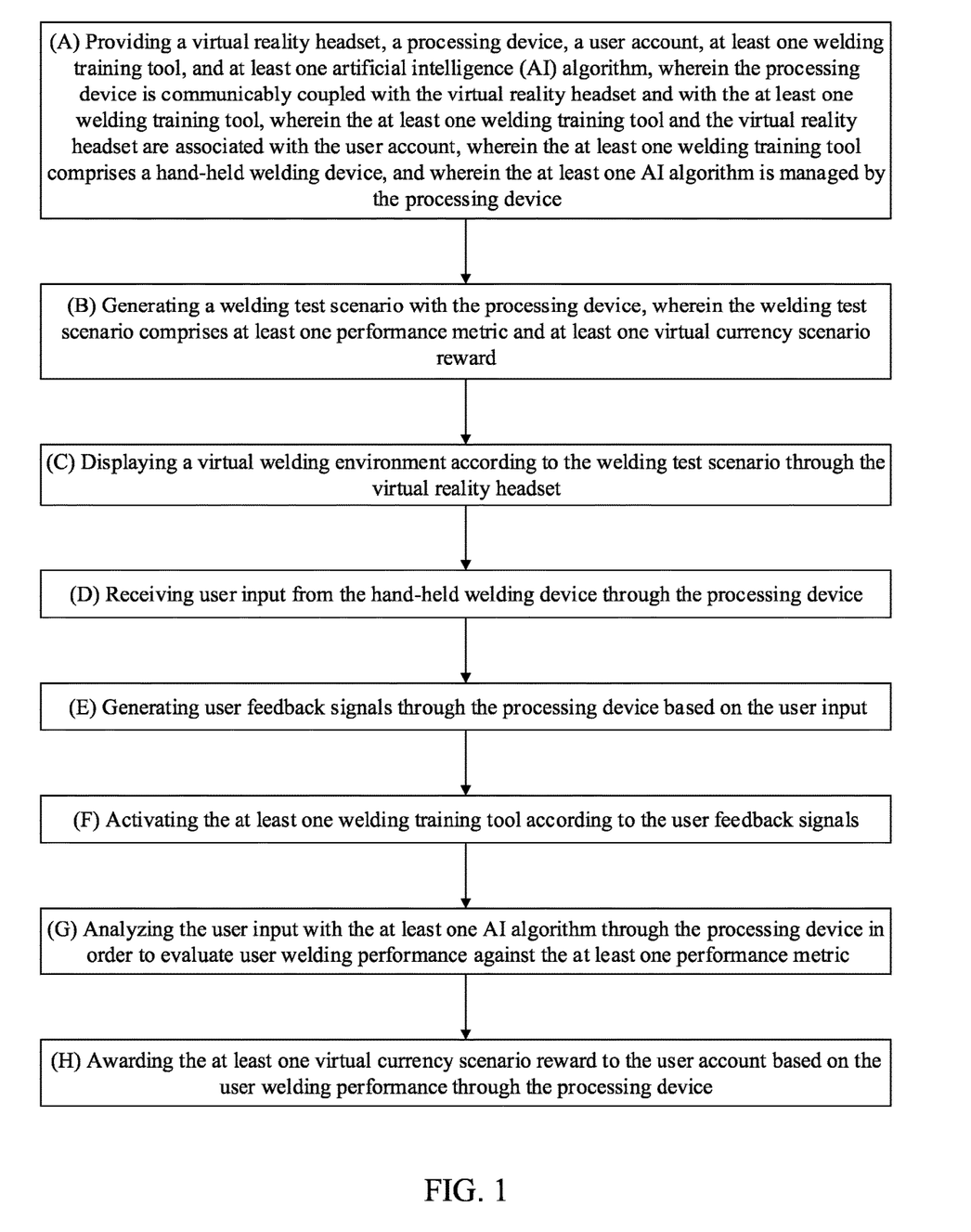
FIG. 1 is a stepwise flow diagram illustrating the general method of the present invention.

In the general method of the present invention as illustrated in FIG. 1, a VR headset is provided, along with a processing device, at least one welding training tool, a user account, and at least one artificial intelligence (AI) algorithm (Step A). The processing device is communicably coupled with the virtual reality headset and with the at least one welding training tool through wired or wireless electronic connections as appropriate.

The processing device may, in various embodiments, correspond to the core processor component of a mobile phone, tablet, laptop or desktop computer, or similar device running the primary instance or software component of the present invention. In various embodiments, the processing device may be used to refer to a linked network of processing units, such as, but not limited to, a cloud computing network. In general, the processing device should not be considered to be limited in scope, and may be understood to represent any device or combination of devices capable of receiving and executing computer-executable instructions and computations in order to carry out the method of the present invention, whether all such instructions and computations are stored and/or executed on a singular computing device or distributed or contextually delegated among multiple communicable coupled computing devices, or any other suitable arrangement. For example, at various stages of the present invention, the processing device may in some instances refer to a personal desktop computer of a user of the present invention, and/or in some instances to a remote server or network of servers tasked with administering and managing the software of the present invention, and/or in some instances to a smart phone, tablet, or similar mobile computing device of the user.

Furthermore, the at least one welding training tool comprises a hand-held welding device. The hand-held welding device may be understood to be the primary user interface through which the user performs welding processes through the present invention. In some embodiments, the hand-held welding device may be one or more tools for automated or semiautomated welding such as, but not limited to, a sub-arc welding tool. The at least one welding training tool and the VR headset are associated with the user account.

Furthermore, in the preferred embodiment of the present invention, the present invention may further utilize AI and/or machine learning methods and algorithms to enhance the user skill development experience through the present invention. Various user data, such as, but not limited to, user identifying data, user input data, and other relevant data may be collected and stored on an appropriate storage device. The stored user data may be analyzed through one or more AI and/or machine learning algorithms and methods. It may be understood that one or more AI algorithms may be comprised in the present invention and configured to perform any relevant task. The at least one AI algorithm is managed by the processing device. In particular, in some embodiments, the user input is stored on a data storage device, and the user input is analyzed with the at least one AI algorithm.

In another aspect, the preferred embodiment of the present invention utilizes gamification tactics to enhance the user's learning and enjoyment experience while interacting with the present invention. Gamification is the application of typical elements of game playing (e.g., point scoring, competition with others, rules of play) to other areas of activity, typically as an online marketing technique to encourage engagement with a product or service. In the present invention, gamification is used to encourage the user toward further engagement with the present invention and to teach and reinforce good welding habits and knowledge.

To this end, the preferred embodiment of present invention incorporates one or more virtual currencies, which is provided to the user account as a reward for various aspects of interaction with the present invention. In one aspect, the present invention may present to the user a list of challenges, tasks, or other activities, each of which the user may complete in order to receive an amount of virtual currency associated with the challenge, task, or activity. An example of a challenge may consist of completing a specific number of activities within a specified time frame; for example, completing five welding scenarios within 24 hours. Other examples of challenges may consist of completing a specific welding scenario with a final score above a specified threshold, or winning one or more competitive multi-player welding scenarios, or the like. The specific nature of the one or more virtual currencies may be regarded as inconsequential; the importance to the present invention is the basic aspect of incorporating the virtual currency for gamification purposes. For example, the one or more virtual currencies may consist of a native currency existing only within the context of the present invention; "WeldBucks." for example, or a virtual type of gem such as diamonds, rubies or sapphires. In some embodiments, the one or more virtual currencies may comprise a previously existing virtual currency, such as, but not limited to, one or more cryptocurrencies.

Figure 3:
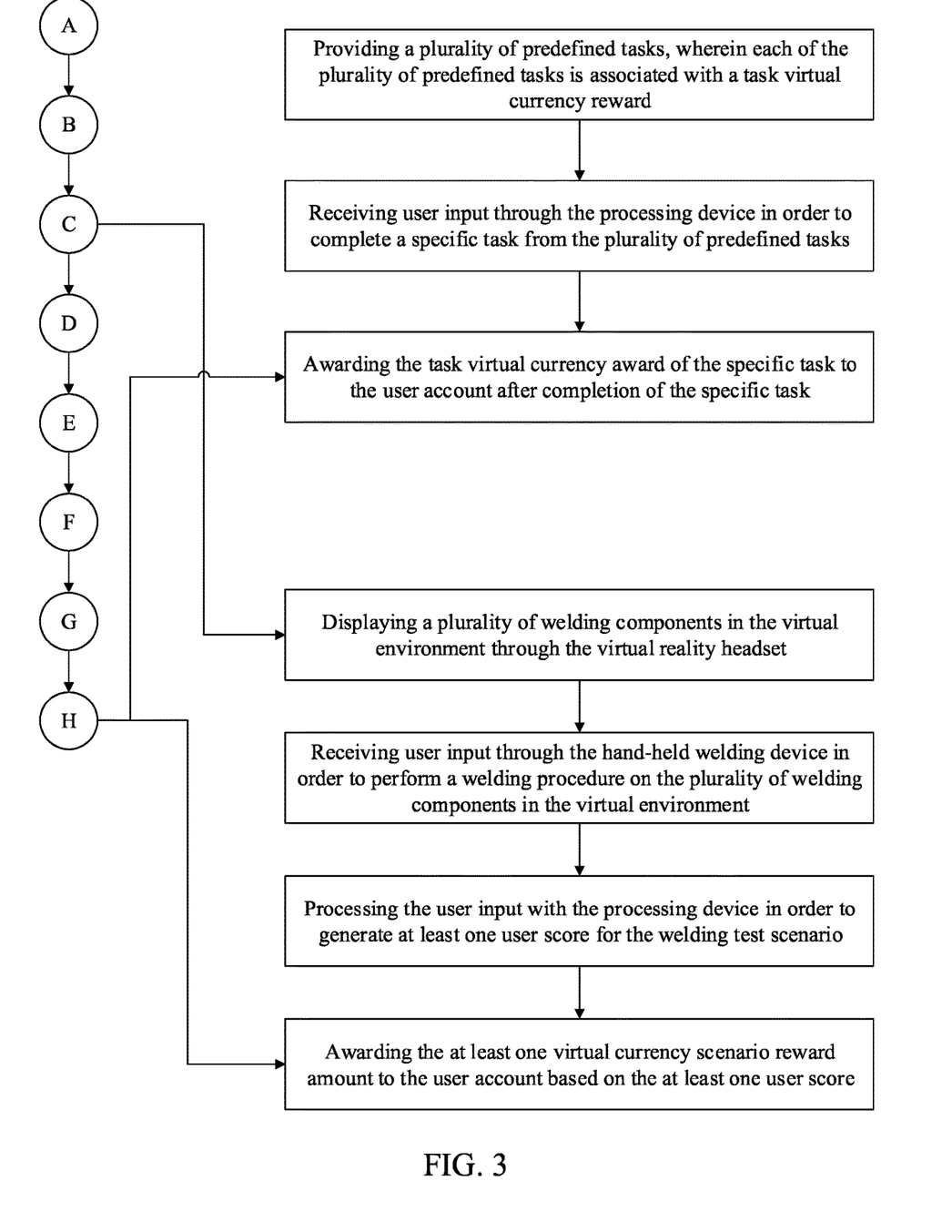
FIG. 3 is a stepwise flow diagram illustrating steps for gamification through virtual currency in accordance with some embodiments of the present invention.

More particularly, in some embodiments, as illustrated in FIG. 3, a plurality of predefined tasks may be provided, wherein each of the plurality of predefined tasks is associated with a task virtual currency reward. User input is then received through the processing device in order to complete a specific task from the plurality of predefined tasks, and the task virtual currency of the specific task is then awarded to the user account after completion of the specific task.

Continuing with the method of the preferred embodiment of the present invention, a welding test scenario is generated with the processing device (Step B), wherein the welding test scenario comprises at least one performance metric and at least one virtual currency scenario reward. A virtual welding environment is then displayed according to the welding test scenario through the VR headset (Step C).

Preferably, the hand-held welding device is capable of motion tracking. Thus, movement of the hand-held welding device in the user's hands is captured and translated into a digital representation of the hand-held welding device in the virtual welding environment. The virtual welding environment may be understood to be any virtual environment rendered through the VR headset which may facilitate welding training. In general, the virtual welding environment may be understood to be a representation of a virtual welding scenario, in which the user may complete welding tasks in the virtual environment.

This, user input is received from the hand-held welding device through the processing device (Step D). The user input preferably includes motion tracking data as the user moves manipulates the hand-held welding device while performing welding processes in the virtual welding environment. Additional user input may be received from the hand-held welding device, such as, but not limited to, input from button presses or switch actuation, or any other input means. In some embodiments, user input may also be received through the processing device. For example, the user may input selections for materials, welding type or other variables through a user input device communicably coupled to the processing device such as a keyboard, mouse, touchscreen, or other type of input device.

In the preferred embodiment, user feedback signals are generated through the processing device based on the user input (Step E). Subsequently, the at least one welding training tool is activated according to the user feedback signals (Step F). In some embodiments, the at least one welding training tool may be activated according to the user feedback signals by activating a vibration device of the at least one welding training tool to provide haptic feedback to the user. In some embodiments the at least one welding training tool may further comprise a sound generation device, a scent generation device, and/or any other devices appropriate for generating feedback in order to accurately simulate a welding environment for the user.

Further, the user input is processed through the processing device in order to evaluate user welding performance against the at least one performance metric (Step G). Specific details of the process of evaluating user welding performance are not disclosed herein, however the user input received through the hand-held welding device and/or other input device as appropriate, corresponding to movement and activation of a virtual representation of the hand-held welding device in relation to any welding components present in the virtual welding environment, is processed according to one or more relevant algorithms or metrics in the software to evaluate the user welding performance.

In some embodiments, a plurality of welding metrics is provided in the software, and the user input is compared to the plurality of metrics in order to generate a pass/fail user grade. In some embodiments, user welding performance is evaluated by generating a welding score, for example between zero and 100. Any given welding scenario may have one or multiple welding metrics unique to the scenario, and/or every welding scenario may have one or more universal welding metrics applied. In the preferred embodiment of the present invention, the welding test scenario is generated and the at least one welding performance metric is predetermined according to at least one welding industry standard. The at least one welding industry standard may correspond to one or more of, but not limited to, the following: American Welding Standards (AWS); American Petroleum Institute (API); American Society of Mechanical Engineers (ASME); military and pharmaceutical grade standards; and/or any other relevant and suitable standards. In the preferred embodiment, the welding performance is analyzed with the at least one AI algorithm in order to execute at least one weld test on the user welding performance through the processing device. In various embodiments, the weld test may include, but is not limited to, a virtual x-ray test, a bend test, a visual test, or another relevant type of test in order to evaluate the user welding performance.

Finally, the at least one virtual currency scenario reward of the welding test scenario is awarded to the user account based on the user welding performance through the processing device.

In various embodiments, a welding test scenario may be generated with the processing device, wherein the welding test scenario comprises at least one completion metric. In some embodiments, generating a welding test scenario may mean simply to rendering all relevant parameters specific to the welding test scenario, which may have been predefined in the software. In some embodiments, generating a welding test scenario may include dynamic generation of the welding test scenario based on various parameters and/or metrics, either user-defined, random, or other.

In some embodiments, the user may be tasked with welding a complete assembly within the virtual welding environment of the present invention. The present invention may further include as features welding practice, blueprint reading, welder's math, welder's metals, machine and parts fabrication activities.

The virtual environment is displayed according to the welding test scenario through the virtual reality headset, and a plurality of welding components is further displayed in the virtual environment through the virtual reality headset. User input is received through the hand-held welding device in order to perform a welding procedure on the plurality of welding components in the virtual environment, and the user input is processed with the processing device in order to generate at least one user score for the welding test scenario. More particularly, the user input may be processed with the at least one AI algorithm through the processing device in order to generate the at least one user score. In some embodiments, the at least one user score may then be compared against the at least one completion metric on order to generate a pass/fail grade for the welding test scenario. In the preferred embodiment, the at least one virtual currency scenario reward amount is rewarded to the user account based on the at least one user score.

In some embodiments, the user may customize their virtual welding experience. Thus, the user may input at least one material selection through a user input device such as a mouse, keyboard, or touchscreen, or through the hand-held welding device if applicable, which is received through the processing device. In various embodiments, the nature of the material selection may vary. For example, in some embodiments, the material selection may correspond to a material thickness of welding components to be welded together, such as, but not limited to, 1/16-inch thickness or 2-inch thickness heavy gauge plates. Furthermore, the material selection may comprise the nature of the material to be welded together, such as, but not limited to, mild steel, stainless steel, aluminum, brass, copper, or any other weldable materials or combination of weldable materials. The material selection may further comprise one or more flat surface or rounded surface selections, beveled edge selections, straight edge selections, weld angles, or any combination of the aforementioned material selection attributes. The welding test scenario is then generated according to the at least one material selection. Furthermore, in some embodiments, a welding type selection may be received through the processing device, and the welding test scenario is generated according to the welding type selection. Similarly, in some embodiments, an edge type selection may be received through the processing device, and the welding test scenario is then generated according to the edge type selection.

Figure 2:
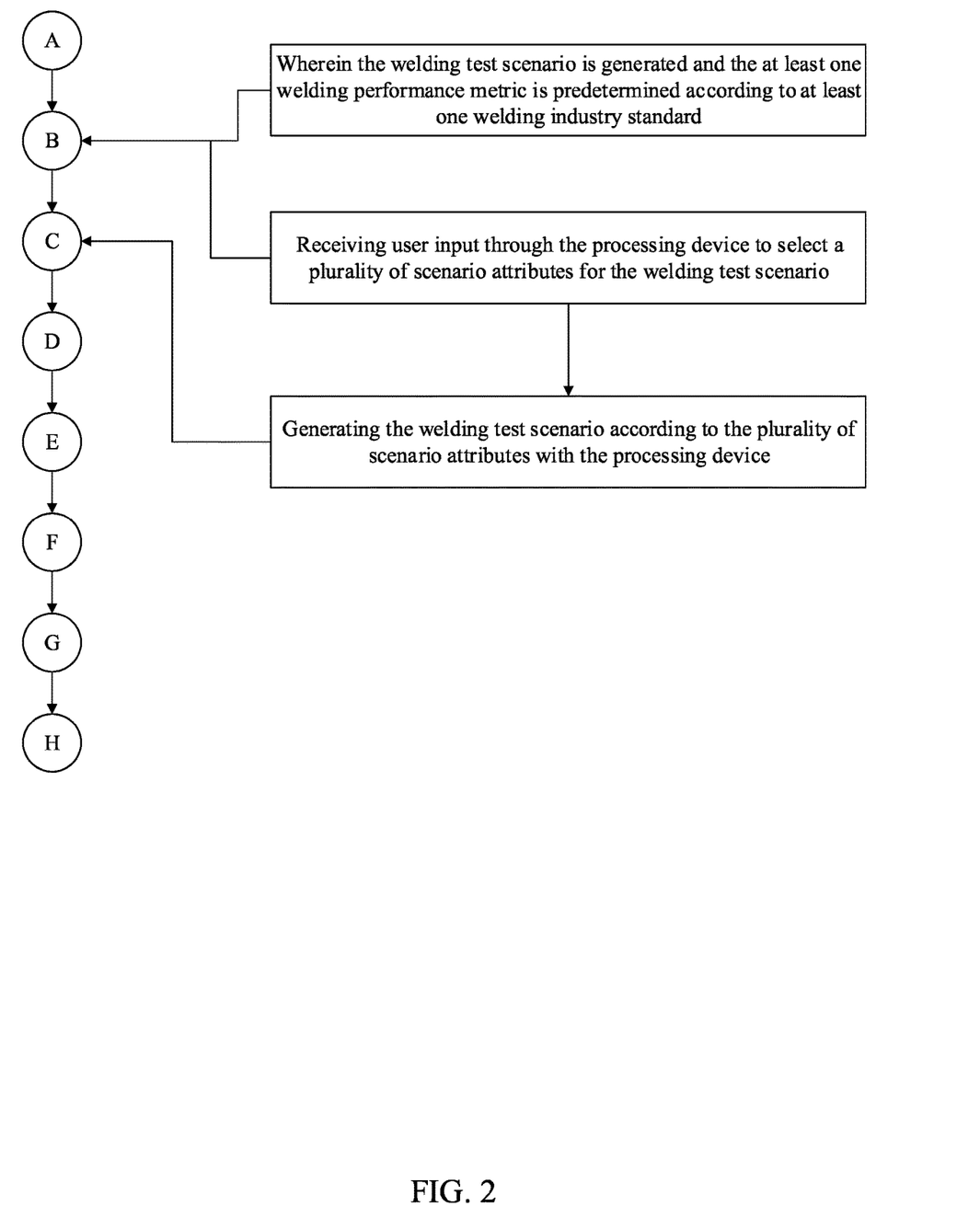
FIG. 2 is a stepwise flow diagram illustrating steps for generating the welding test scenario in accordance with some embodiments of the present invention.

Further, as illustrated in FIG. 2, in some embodiments, user input may be received through the processing device to select a plurality of scenario attributes for the welding test scenario. In various embodiments, the plurality of scenario attributes may or may not include or overlap with the at least one material selection. Preferably, all types of metals may be represented and chosen to work with in the virtual welding environment through the present invention, including, but not limited to: different grades of mild steels, aluminum, stainless, copper, nickel, iron, magnesium, zinc, lead, tin, cobalt, bismuth, tungsten, and any other suitable metal. The user may be presented with the option to choose which one or more metals to work with in all relevant activities or certain predetermined activities enabled through the present invention as one of the plurality of scenario attributes. Moreover, the plurality of scenario attributes which the user may select may include, but are not limited to: best practice machines, shielding gases, wire sizes, and set-up welding machines to the correct welding qualifications and specifications for welding the parts together in any position or angle.

Figure 4:
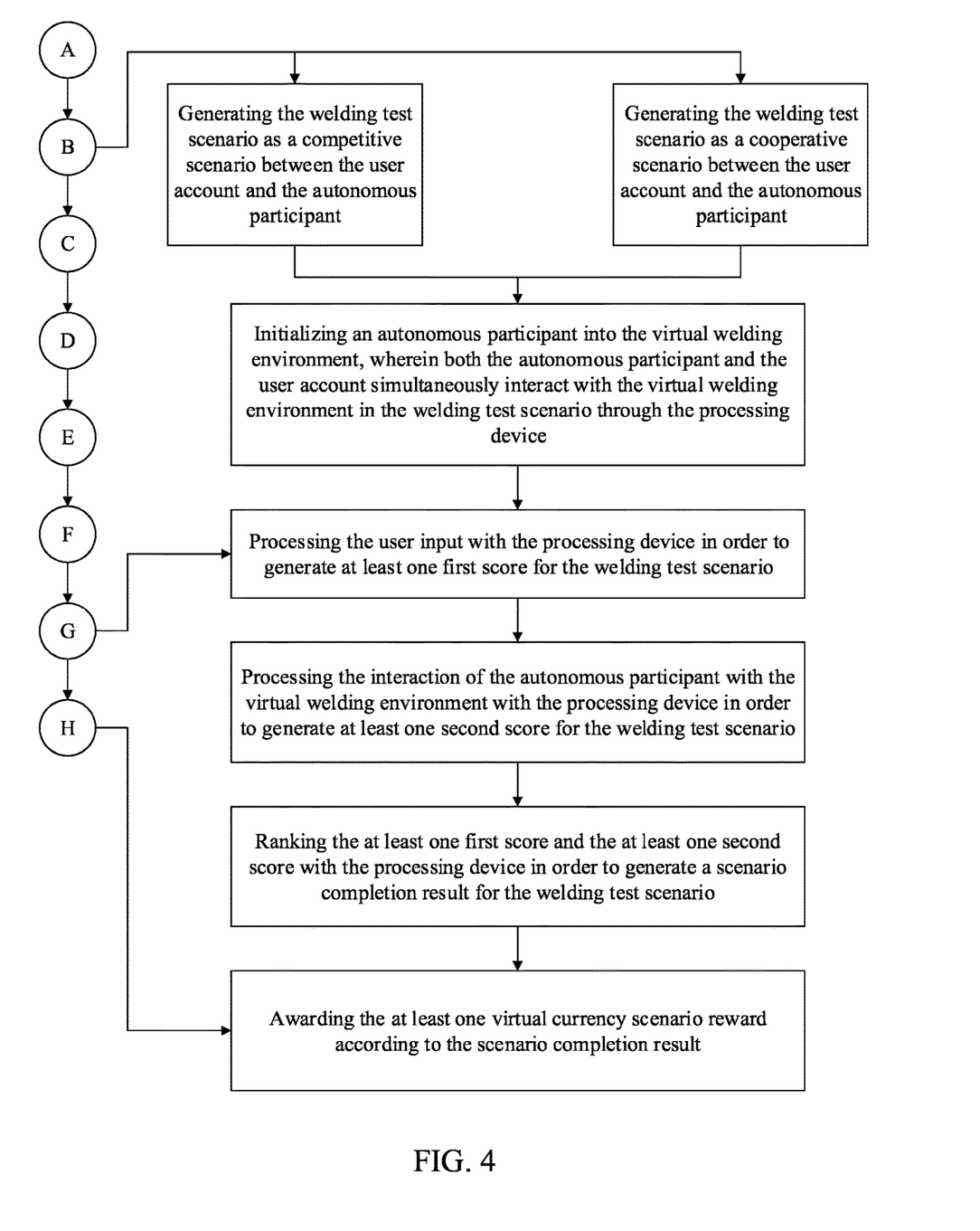
FIG. 4 is a stepwise flow diagram illustrating steps for implementing multiplayer welding scenarios in accordance with some embodiments of the present invention.

In the preferred embodiment, multiple users of the present invention may be able to compete against or cooperate with each other in real-time welding training scenarios. Additionally, a single user may be enabled to compete against or cooperate with a computer-controlled participant in a welding scenario instead of a real person. Referring to FIG. 4, to this end in the preferred embodiment an autonomous participant may be initialized into the virtual welding environment, wherein both the autonomous participant and the user account simultaneously interact with the virtual welding environment in the welding training scenario through the processing device. The user input may be processed with the processing device, more particularly processed with one of the at least one AI algorithm through the processing device in some embodiments, in order to generate at least one first score for the welding training scenario. The interaction of the autonomous participant with the virtual welding environment may further be processed with the processing device, or more particularly with at least one of the at least one AI algorithm through the processing device in some embodiments, in order to generate at least one second score for the welding test scenario. Subsequently, the at least one first score and the at least one second score are ranked with the processing device in order to generate a scenario completion result for the welding training scenario. Further, in the preferred embodiment, the at least one virtual currency scenario reward is awarded according to the scenario completion result.

Depending on the type of the welding training scenario, the nature of the scenario completion result may differ. In some embodiments, the welding test scenario may be generated as a competitive scenario between the user account and the autonomous participant, wherein the scenario completion result of the competitive scenario corresponds to designating either the user account or the autonomous participant as the winner of the competitive scenario. In some embodiments, the welding test scenario may be generated as a cooperative scenario between the user account and the autonomous participant, wherein the scenario completion result of the competitive scenario may corresponds to a cooperative scenario win condition, and may further correspond to other relevant conditions, such as, but not limited to, ranking the user account and the autonomous participant according to the at least one first score and the at least one second score.

In the preferred embodiment, a user avatar may be provided for the user account in the virtual welding environment. The user avatar may consist of any suitable visual element that may be displayed within the virtual welding environment, or in other environments or circumstances within the present invention. Preferably, the user avatar may be a digital three-dimensional representation of a human. The user may further be enabled to customize their user avatar to their liking, for example by choosing various clothing items or accessories to be displayed on the user avatar, or any other suitable characteristic or attribute. To this end, user input may be received through the processing device to select at least one visual element for the user avatar. The user avatar may then be displayed in the virtual welding environment with the at least one visual attribute through the processing device.

Further, in the preferred embodiment of the present invention, the user may select from a plurality of welding training activities. The welding training activities may include, but are not limited to, welding test scenarios as previously discussed, freestyle welding scenarios, welding mathematics activities, automated machine welding such as sub-arc or other type of automated equipment, equipment setup activities, and blueprint reading activities, or any other relevant activity enabled through the present invention. Thus, a list of welding training activities is displayed on the VR headset. An activity selection is received through the processing device, wherein the activity selection corresponds to a specific training activity from the list of welding training activities, and the specific training activity is subsequently generated through the processing device in the virtual welding environment and displayed on the VR headset.

Further, the present invention may provide a sequence of welding training scenarios through which the user is allowed to progress in order to augment their welding skills. Thus, a passing grade may be generated for an arbitrary scenario from the sequence of welding training scenarios based on the user input during the arbitrary scenario. Access to a subsequent scenario from the sequence of welding training scenarios is then granted to the user, wherein the arbitrary scenario precedes the subsequent scenario in the sequence of welding training scenarios. In some embodiments, the sequence of welding training scenarios may be designed according to current or future welding certifications standards, such that a user may be afforded the opportunity to procure a welding certification by progressing through a welding training program provided through the present invention. Further, each of the sequence of welding training scenarios, or the sequence of welding training scenarios as a whole, may be associated with one or more specified virtual currency amounts, which are rewarded to the user account upon completion of the relevant scenario or sequence of scenarios.

Furthermore, a mathematics skill building scenario may be displayed through the VR headset, wherein the user may interact with the mathematics skill building scenario in order to practice relevant mathematics skills. Similarly, a blueprint reading skill building scenario may be displayed through the virtual reality headset. Further, the mathematics skill building scenario and the blueprint reading skill building scenario may similarly be associated with one or more specified virtual currency amount.

Preferably in the software of the present invention, the user is further provided with at least one weld review tool in the virtual welding environment. The at least one weld review tool may be utilized to assess their welding performance after or during a welding process in the virtual environment. Each of the at least one weld review tool may be understood to be a component or collection of components in the software which may be used to evaluate a welding performance. Thus, a welding scenario in the virtual welding environment may be designated as a completed welding scenario after the user finishes their welding performance, such that the completed welding scenario comprises a finished weld. In various embodiments, the finished weld may further be grinded in the virtual environment through the present invention. The finished weld is displayed through the VR headset, and user input may be received through the processor and/or the at least one welding training tool to activate the weld review tool in order to review at least one specific weld of the user welding performance, or the finished weld, in the virtual environment with the at least one weld review tool. In some embodiments, the at least one weld review tool comprises a cross-section viewer tool enabling the user to view cross-sections of the completed weld at any desired location and angle. Various embodiments of the present invention may comprise various other types of weld review tools as appropriate.

Further, in the preferred embodiment, the user is allowed to see review playback of their welds in slow or fast motion after each weld. Further, the user is allowed to look closely at the puddle of the weld as the at least one welding training tool is moved along the welding puddle in the virtual welding environment. Students will be allowed to see a perfect, bad, or marginal weld inside VRWeld after every weld made during single or multi-overlapped welds so that their skill level and dexterity improves through the multiple levels of the VRWeld product.

As previously mentioned, in various embodiments, the present invention may comprise various means for generating real-time user feedback in accordance with their welding performance in the virtual environment in order to accurately simulate a real-world welding experience. As such, in various embodiments of the present invention, various accessory devices may be implemented to generate real-world user feedback. Thus, in some embodiments the at least one welding training tool may comprise a sound generation device, and the sound generation device is activated according to the user feedback signals. For example, when the user is performing a weld in the virtual environment, the sound generation device may be activated to produce welding sounds. Furthermore, in some embodiments the at least one welding training tool comprises a scent generation device, and the scent generation device may be activated during virtual welding according to the user feedback signals. The scent generation device may be any physical device which is capable of producing one or more scents according to the user feedback signals. For example, the scent generation device may comprise, but is not limited to, a smoke generator, or a fragrance machine. The at least one welding training tool may further comprise any other desired user feedback device, such as, but not limited to, a vibration generator or other devices. The sound generation device, the scent generation device, and any similar peripheral user feedback generation devices may be integrated into the VR headset, the hand-held welding device, or may be a separate component further communicatively coupled with the processing device.

Figure 5:
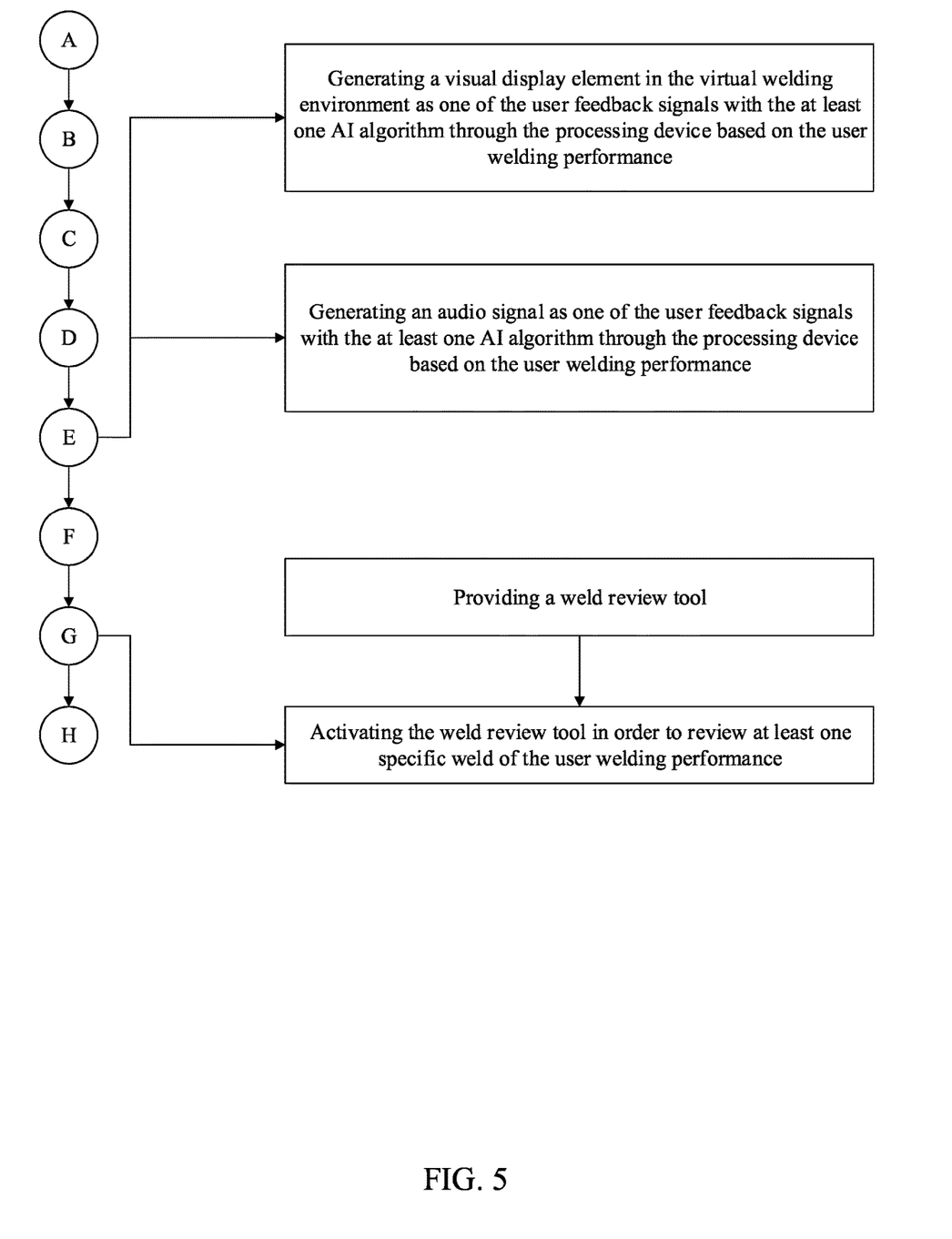
FIG. 5 is a stepwise flow diagram illustrating steps for providing user feedback in accordance with some embodiments of the present invention.

In the preferred embodiment, the at least one AI algorithm is used throughout the present invention as appropriate to provide feedback to the user in order to gently adjust the user experience so that the user is guided toward more efficient learning and higher skill levels faster than without such feedback. In some embodiments, a visual display element may be generated in the virtual welding environment as one of the user feedback signals with the at least one AI algorithm through the processing device based on the used welding performance. In some embodiments, the visual display element may comprise a text box displaying a particular message to the user. For example, if the weld being created by the user in the during the welding test scenario is not straight enough, the visual display element may be, for example, "Not welding straight!" Thus, the user may be able to view the visual display element and correct their welding behavior accordingly. In some embodiments, the visual display element may a different type of visual element intended to grab the user's attention, such as a colored progress bar changing gradually from green to red, indicating a transition from a good weld to a bad weld. Such visual elements may be implemented by the at least one AI algorithm in conjunction with any relevant feature implemented by the present invention. For example, if the user is participating in a knowledge quiz and selects an incorrect answer, a visual display element may appear in the virtual welding environment, or whatever digital environment the knowledge quiz happens to take place in, displaying a message such as, for example, "Are you SURE that's the right answer?", thus gently encouraging and guiding the user through a more efficient and pleasant learning experience. In some embodiments, as seen in FIG. 5, an audio signal may be generated as one of the user feedback signals with the at least one AI algorithm through the processing device based on the welding performance. For example, instead of or in addition to the aforementioned visual display element of "Not welding straight!", an audio signal may be generated of a voice speaking those same words, or a similar audio message, or the audio signal may simply be an alert sound to indicate that something is wrong.

Further, the preferred embodiment of the present invention may be provided in two primary segments—a "welding laboratory" and a "real-world environment." Thus, in some embodiments, activities, and/or features of the present invention, the virtual welding environment may be generated as a simulated training environment, corresponding to the "welding laboratory." In some embodiments, activities, and/or features of the present invention, the virtual welding environment may be a simulated world environment in order to provide a more immersive user experience.

Figure 6:
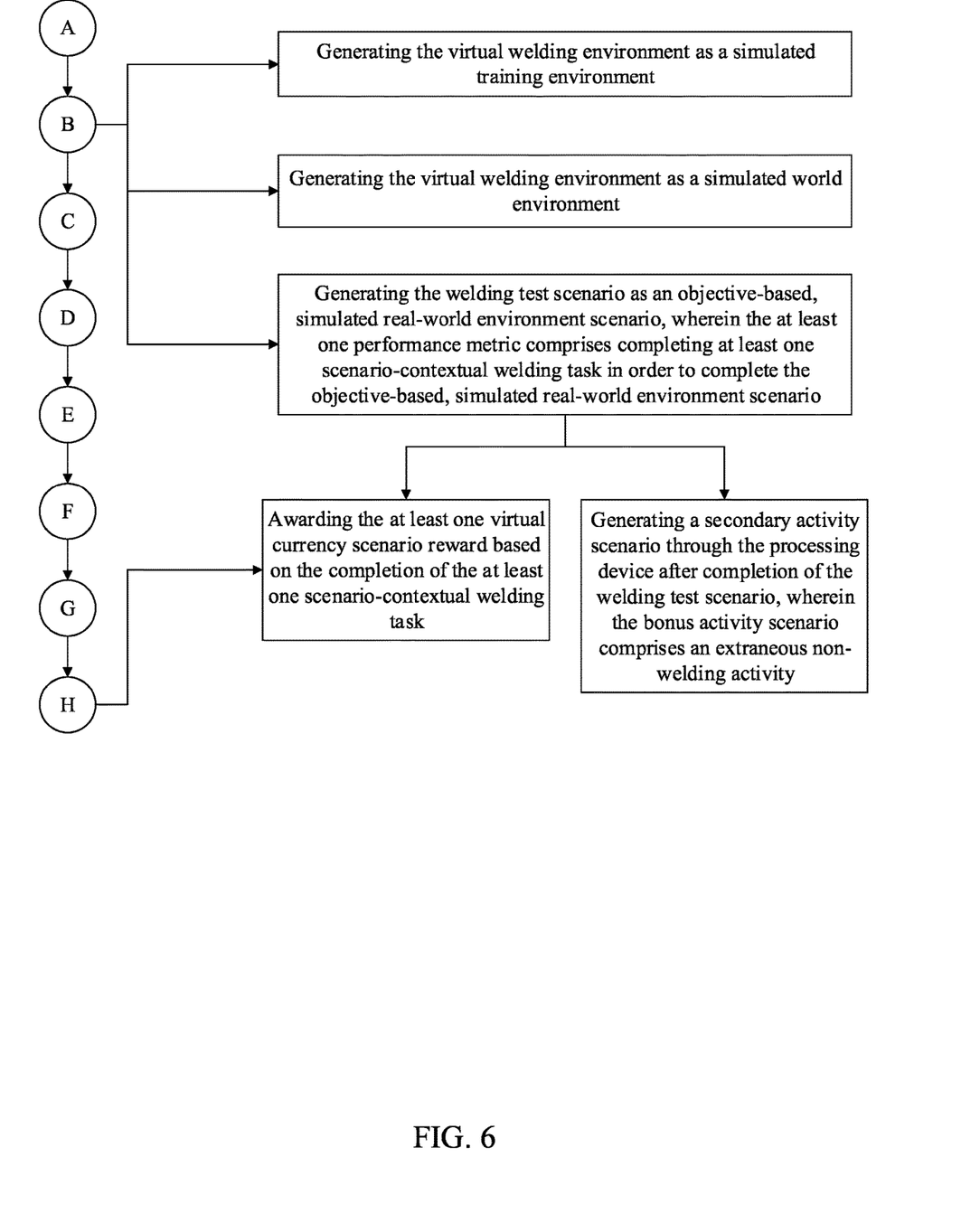
FIG. 6 is a stepwise flow diagram illustrating steps for implementing gamified and immersive welding scenarios in accordance with some embodiments of the present invention.

Referring to FIG. 6, more particularly, in some embodiments, activities, and/or features of the present invention, the welding test scenario may be generated as an objective-based, simulated real-world environment scenario, wherein the at least one performance metric comprises completing at least one scenario-contextual welding task in order to complete the objective-based, simulated real-world environment scenario. Further, the at least one virtual currency reward may be awarded to the user account or other relevant entity based on the completion of the at least one scenario-contextual welding task. The objective-based, simulated real-world environment scenario is another implementation of gamification in the present invention, providing engaging environments which may be familiar to the user and clear contextual goals to accomplish within the environment. Examples of such environments may include, but are not limited to: a motorsports or automotive scenario or garage, bridge construction, a high rise building construction site, a shipyard, an airplane or aerospace hangar, or houses in Los Angeles with the Hollywood sign visible in the background or another location of the environment.

For example, in one potential objective based, simulated real-world environment scenario, one or more antagonists may be presented, who have previously created or are in the act of creating bad welds with nefarious, destructive intent, for example to destroy a building. Thus, the exemplary scenario-contextual welding task the user is presented with is to thwart the antagonists by repairing the bad welds in order to save the building. Various such scenarios and others without limitation may be implemented without departing from the intended spirit and scope of the present invention.

Further, in some embodiments, after completing certain activities, such as, but not limited to the simulated real-world environment scenario, a secondary activity scenario may be generated through the processing device after completion of the welding test, wherein the bonus activity scenario comprises an extraneous non-welding activity. The purpose of the secondary activity scenario is purely for entertainment purposes for the user. In various embodiments, the nature of the secondary activity scenario may vary. In some embodiments, the secondary activity scenario is a racing activity, wherein the user may control a vehicle such as an automobile, motorcycle, bicycle, scooter, skateboard, airplane, fighter jet, or other suitable entity while attempting to finish traversing a racecourse or the like in first place, ahead of any other competitors in the secondary activity scenario, computer-controlled or otherwise. Other types of secondary activity scenarios, or bonus rounds, may involve any other desired type of video gaming activity. The secondary activity scenario may be triggered by certain specified conditions, such as achieving a certain score in a welding test scenario or a blueprint reading activity or other such activity, or through other conditions.

Figure 7:
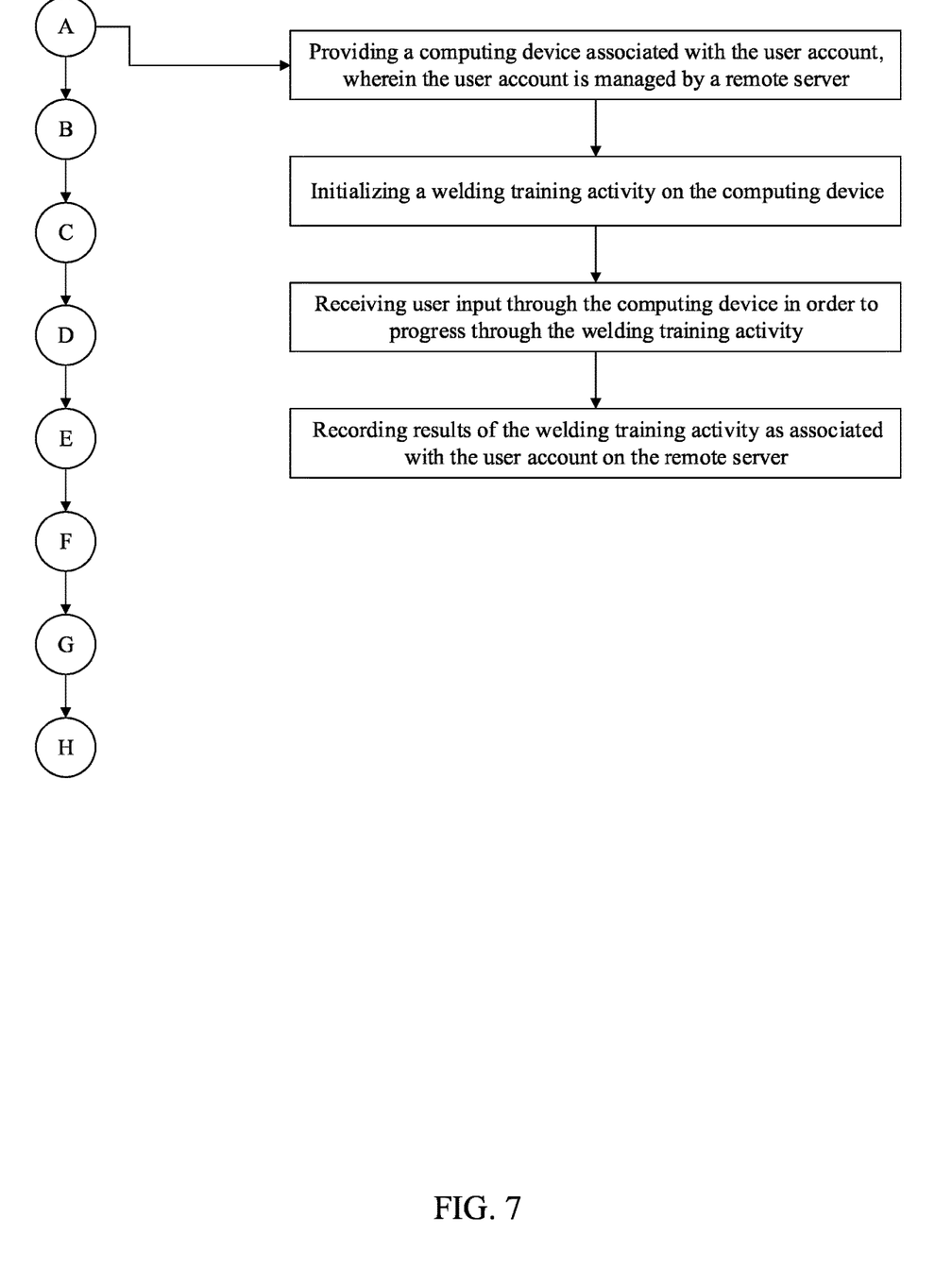
FIG. 7 is a stepwise flow diagram illustrating steps for integrating a smartphone application for secondary welding training activities in accordance with some embodiments of the present invention.

Further, in the preferred embodiment, the user is afforded the capability to interact with the present invention without the need of the VR headset. To this end, as seen in FIG. 7, a computing device may be provided, wherein the computing device is associated with the user account, and wherein the user account is managed by a remote server. The computing device may be, but is not limited to, a mobile smart phone or similar smart device, or a personal desktop computer or laptop computer, or other such suitable device. A welding training activity may be initialized on the computing device, and user input may subsequently be received through the computing device in order to progress through the welding training activity. Finally, the results of the welding training activity may be recorded as associated with the user account on the remote server. In this way, the user may make use of the present invention even without using the VR headset to perform simulated welding activities. For example, the user may use a smartphone application to access the present invention, through which the user may participates in one or more of the aforementioned secondary learning activities, such as, but not limited to, blueprint learning, welder's math, welder's metals, or other suitable welding training activities. Activity recorded through the computing device is stored on the remote server and synced with the processing device, so that the user's progress is preserved across multiple devices interacting with the same system of the present invention.

Figure 8:
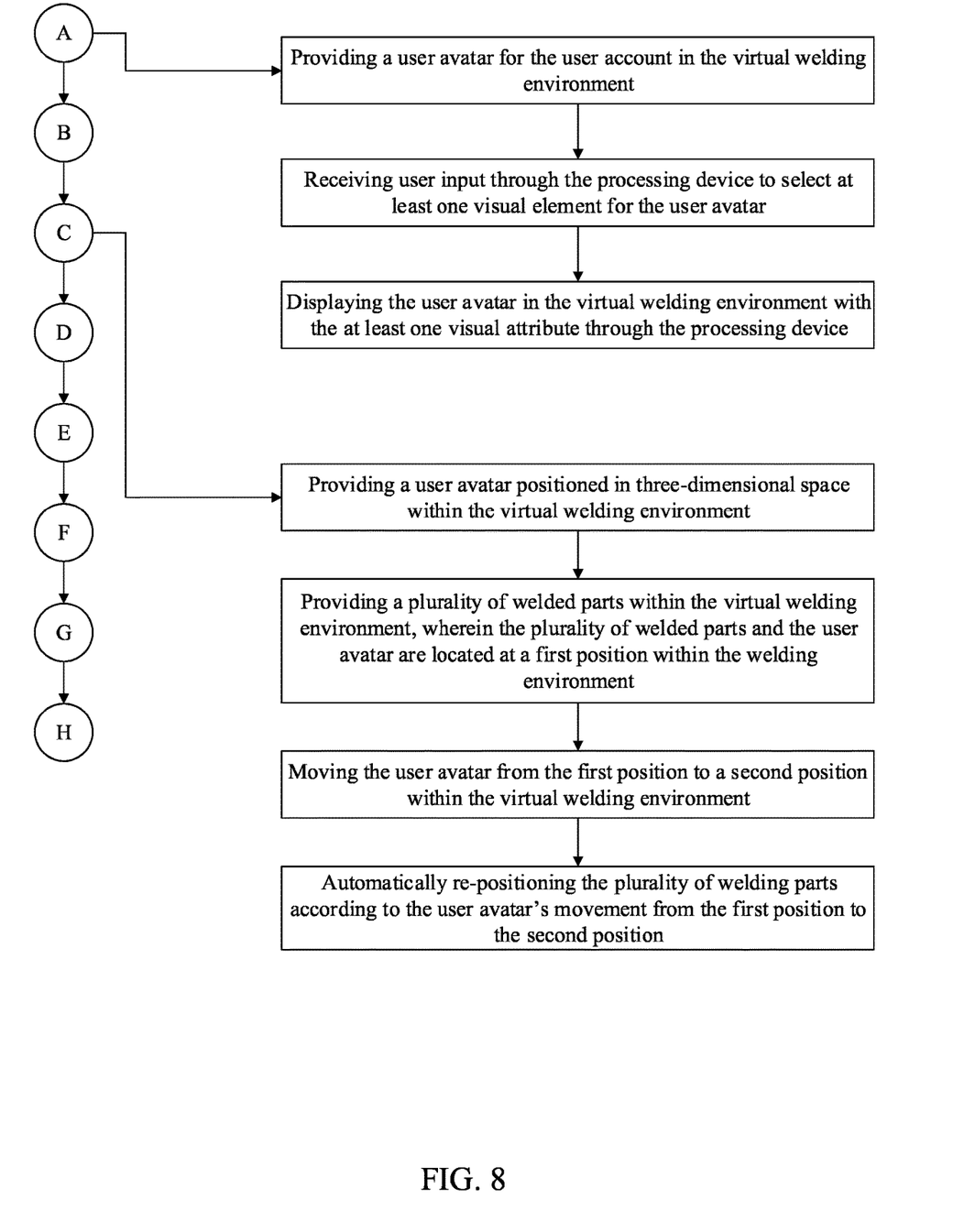
FIG. 8 is a stepwise flow diagram illustrating steps for customizing a user avatar and automatically repositioning elements including the user avatar in the virtual welding environment in accordance with some embodiments of the present invention.

Further, the preferred embodiment of the present invention incorporates a repositioning feature, wherein welded parts will be automatically repositioned so that when the user moves to a new position, the software of the present invention automatically adjusts itself accordingly in the virtual welding environment. To this end, as illustrated in FIG. 8, a user avatar may be provided and positioned in three-dimensional space within the virtual welding environment, and a plurality of welded parts may further be provided within the virtual welding environment, wherein the plurality of welded parts and the user avatar are located at a first position within the welding environment. The user avatar is then moved from the first position to a second position within the virtual welding environment. Subsequently, the plurality of welded parts is automatically repositioned according to the user avatar's movement from the first position to the second position. This may provide the user with the ability to adjust the physical position of their body while interacting with the virtual welding environment through the VR headset and the at least one training tool, for example to lean on an object for support or comfort, such that the present invention automatically adjusts the virtual welding environment and the entities within accordingly to the physical repositioning of the user's body.

In view of the foregoing disclosure, the present invention presents a method of training for welding through a combination of software and hardware enabling a user to interact with a virtual welding environment, through which the user may experience a wide variety of virtual training activities in order to gain welding experience, reduce waste, and increase quality requirements, enhanced through AI and gamification aspects.

Although the invention has been explained in relation to its preferred embodiment, it is to be understood that many other possible modifications and variations can be made without departing from the spirit and scope of the invention as hereinafter claimed.

What is claimed is:

1. A method of training for welding through virtual reality comprises the steps of:
    (A) providing a virtual reality headset, a processing device, a user account, at least one welding training tool, and at least one artificial intelligence (AI) algorithm, wherein the processing device is communicably coupled with the virtual reality headset and with the at least one welding training tool, wherein the at least one welding training tool and the virtual reality headset are associated with the user account, wherein the at least one welding training tool comprises a hand-held welding device, and wherein the at least one AI algorithm is managed by the processing device;
    (B) generating a welding test scenario with the processing device, wherein the welding test scenario comprises at least one performance metric and at least one virtual currency scenario reward;
    (C) displaying a virtual welding environment according to the welding test scenario through the virtual reality headset;
    (D) receiving user input from the hand-held welding device through the processing device;
    (E) generating user feedback signals through the processing device based on the user input;
    (F) activating the at least one welding training tool according to the user feedback signals;
    (G) analyzing the user input with the at least one AI algorithm through the processing device in order to evaluate user welding performance against the at least one performance metric; and
    (H) awarding the at least one virtual currency scenario reward to the user account based on the user welding performance through the processing device.

2. The method of training for welding through virtual reality as claimed in claim 1, wherein the welding test scenario is generated and the at least one welding performance metric is predetermined according to at least one welding industry standard.

3. The method of training for welding through virtual reality as claimed in claim 1 comprises the steps of:
    receiving user input through the processing device to select a plurality of scenario attributes for the welding test scenario; and
    generating the welding test scenario according to the plurality of scenario attributes with the processing device.

4. The method of training for welding through virtual reality as claimed in claim 1 comprises the step of:
    analyzing the welding performance with the at least one AI algorithm in order to execute at least one weld test on the user welding performance through the processing device.

5. The method of training for welding through virtual reality as claimed in claim 1 comprises the steps of:
    providing a plurality of predefined tasks, wherein each of the plurality of predefined tasks is associated with a task virtual currency reward;
    receiving user input through the processing device in order to complete a specific task from the plurality of predefined tasks; and
    awarding the task virtual currency award of the specific task to the user account after completion of the specific task.

6. The method of training for welding through virtual reality as claimed in claim 1 comprises the steps of:
    displaying a plurality of welding components in the virtual environment through the virtual reality headset;
    receiving user input through the hand-held welding device in order to perform a welding procedure on the plurality of welding components in the virtual environment;
    processing the user input with the processing device in order to generate at least one user score for the welding test scenario; and
    awarding the at least one virtual currency scenario reward amount to the user account based on the at least one user score.

7. The method of training for welding through virtual reality as claimed in claim 1 comprises the steps of:
    initializing an autonomous participant into the virtual welding environment, wherein both the autonomous participant and the user account simultaneously interact with the virtual welding environment in the welding test scenario through the processing device;
    processing the user input with the processing device in order to generate at least one first score for the welding test scenario;
    processing the interaction of the autonomous participant with the virtual welding environment with the processing device in order to generate at least one second score for the welding test scenario; and
    ranking the at least one first score and the at least one second score with the processing device in order to generate a scenario completion result for the welding test scenario.

8. The method of training for welding through virtual reality as claimed in claim 7 comprises the step of:
    awarding the at least one virtual currency scenario reward according to the scenario completion result.

9. The method of training for welding through virtual reality as claimed in claim 7 comprises the step of:
    generating the welding test scenario as a competitive scenario between the user account and the autonomous participant.

10. The method of training for welding through virtual reality as claimed in claim 7 comprises the step of:
    generating the welding test scenario as a cooperative scenario between the user account and the autonomous participant.

11. The method of training for welding through virtual reality as claimed in claim 1 comprises the steps of:
    providing a user avatar for the user account in the virtual welding environment;
    receiving user input through the processing device to select at least one visual element for the user avatar; and
    displaying the user avatar in the virtual welding environment with the at least one visual attribute through the processing device.

12. The method of training for welding through virtual reality as claimed in claim 1 comprises the step of:
    generating a visual display element in the virtual welding environment as one of the user feedback signals with the at least one AI algorithm through the processing device based on the user welding performance.

13. The method of training for welding through virtual reality as claimed in claim 1 comprises the step of:
    generating an audio signal as one of the user feedback signals with the at least one AI algorithm through the processing device based on the user welding performance.

14. The method of training for welding through virtual reality as claimed in claim 1 comprises the step of:

generating the virtual welding environment as a simulated training environment.

15. The method of training for welding through virtual reality as claimed in claim 1 comprises the step of:
generating the virtual welding environment as a simulated world environment.

16. The method of training for welding through virtual reality as claimed in claim 1 comprises the steps of:
generating the welding test scenario as an objective-based, simulated real-world environment scenario, wherein the at least one performance metric comprises completing at least one scenario-contextual welding task in order to complete the objective-based, simulated real-world environment scenario; and
awarding the at least one virtual currency scenario reward based on the completion of the at least one scenario-contextual welding task.

17. The method of training for welding through virtual reality as claimed in claim 1 comprises the step of:
generating a secondary activity scenario through the processing device after completion of the welding test scenario, wherein the bonus activity scenario comprises an extraneous non-welding activity.

18. The method of training for welding through virtual reality as claimed in claim 1 comprises the steps of:
providing a computing device associated with the user account, wherein the user account is managed by a remote server;
initializing a welding training activity on the computing device;
receiving user input through the computing device in order to progress through the welding training activity; and
recording results of the welding training activity as associated with the user account on the remote server.

19. The method of training for welding through virtual reality as claimed in claim 1 comprises the steps of:
providing a user avatar positioned in three-dimensional space within the virtual welding environment;
providing a plurality of welded parts within the virtual welding environment, wherein the plurality of welded parts and the user avatar are located at a first position within the welding environment;
moving the user avatar from the first position to a second position within the virtual welding environment; and
automatically re-positioning the plurality of welding parts according to the user avatar's movement from the first position to the second position.

20. The method of training for welding through virtual reality as claimed in claim 1 comprises the steps of:
providing a weld review tool; and
activating the weld review tool in order to review at least one specific weld of the user welding performance.

* * * * *